(12) United States Patent
Pinto et al.

(10) Patent No.: US 8,719,841 B2
(45) Date of Patent: May 6, 2014

(54) DISPATCH MECHANISM FOR COORDINATING APPLICATION AND COMMUNICATION MEDIUM STATE

(75) Inventors: Edmund Samuel Victor Pinto, Duvall, WA (US); Nicholas A. Allen, Redmond, WA (US); Karthik Raman, Issaquah, WA (US); Kenneth D. Wolf, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 874 days.

(21) Appl. No.: 12/605,236

(22) Filed: Oct. 23, 2009

(65) Prior Publication Data
US 2010/0107177 A1  Apr. 29, 2010

Related U.S. Application Data

(63) Continuation-in-part of application No. 12/018,401, filed on Jan. 23, 2008, which is a continuation-in-part of application No. 12/019,041, filed on Jan. 24, 2008.

(60) Provisional application No. 60/988,737, filed on Nov. 16, 2007, provisional application No. 60/988,736, filed on Nov. 16, 2007.

(51) Int. Cl.
*G06F 9/44* (2006.01)
*G06F 17/30* (2006.01)
*G06F 15/16* (2006.01)

(52) U.S. Cl.
USPC ............ 719/313; 707/705; 709/203; 719/328

(58) Field of Classification Search
USPC .................. 707/705; 709/203; 719/313, 328
See application file for complete search history.

(56) References Cited

U.S. PATENT DOCUMENTS

| 5,339,392 A | 8/1994 | Risberg |
| 5,371,889 A | 12/1994 | Klein |
| 5,452,445 A | 9/1995 | Hallmark |
| 5,465,328 A * | 11/1995 | Dievendorff et al. ........... 714/15 |
| 5,592,622 A | 1/1997 | Isfeld |
| 5,802,310 A | 9/1998 | Rajaraman |

(Continued)

FOREIGN PATENT DOCUMENTS

| EP | 1198106 | 4/2002 |
| EP | 1873643 | 1/2008 |
| WO | 2006118529 | 11/2006 |

OTHER PUBLICATIONS

Notice of Allowance dated Jan. 18, 2012 cited in U.S. Appl. No. 12/767,091.

(Continued)

*Primary Examiner* — Charles E Anya
(74) *Attorney, Agent, or Firm* — Ben Taylor; David Andrews; Micky Minhas (57) ABSTRACT

The present invention extends to methods, systems, and computer program products for coordinating application state and communication medium state. Embodiments of the invention provide mechanisms by which a dispatcher can enable application code to coordinate changes in application state with the consumption of messages from a communication medium. The coordination can be automatic where the dispatcher performs the coordination, or manual, where the coordination is performed more expressly by application code. Embodiments also include mechanisms by which applications targeting an execution (e.g., continuation based) runtime may compose alternative state transitions in the application with a peek lock protocol.

20 Claims, 6 Drawing Sheets

(56) References Cited

U.S. PATENT DOCUMENTS

| | | | |
|---|---|---|---|
| 5,913,213 A | 6/1999 | Wikstrom | |
| 5,924,097 A | 7/1999 | Hill et al. | |
| 5,974,442 A | 10/1999 | Adams | |
| 6,185,197 B1 | 2/2001 | Cheung | |
| 6,263,360 B1 | 7/2001 | Arnold | |
| 6,332,150 B1 | 12/2001 | Khan et al. | |
| 6,353,834 B1 | 3/2002 | Wong | |
| 6,425,017 B1* | 7/2002 | Dievendorff et al. | 719/315 |
| 6,463,480 B2 | 10/2002 | Kikuchi | |
| 6,484,196 B1 | 11/2002 | Maurille | |
| 6,609,178 B1 | 8/2003 | Ofer | |
| 6,687,735 B1 | 2/2004 | Logston et al. | |
| 6,748,583 B2 | 6/2004 | Aizenbud-Reshef et al. | |
| 6,817,018 B1 | 11/2004 | Clarke | |
| 6,845,230 B2 | 1/2005 | Syed | |
| 6,848,108 B1 | 1/2005 | Caron | |
| 6,848,109 B1 | 1/2005 | Kühn | |
| 6,853,617 B2 | 2/2005 | Watson | |
| 6,886,041 B2 | 4/2005 | Messinger | |
| 6,886,169 B2 | 4/2005 | Wei | |
| 6,968,395 B1 | 11/2005 | Lee | |
| 6,971,001 B1 | 11/2005 | Rolfs | |
| 6,983,322 B1* | 1/2006 | Tripp et al. | 709/225 |
| 7,068,634 B2 | 6/2006 | Vanttinen | |
| 7,111,001 B2 | 9/2006 | Harris | |
| 7,149,976 B2 | 12/2006 | Yagati | |
| 7,154,901 B2 | 12/2006 | Chava | |
| 7,200,676 B2 | 4/2007 | Christensen | |
| 7,240,350 B1 | 7/2007 | Eberhard | |
| 7,318,109 B2 | 1/2008 | Liscano | |
| 7,330,860 B2 | 2/2008 | Adiba | |
| 7,370,329 B2* | 5/2008 | Kumar et al. | 718/107 |
| 7,380,135 B2 | 5/2008 | Nishimoto et al. | |
| 7,392,057 B2 | 6/2008 | Lee | |
| 7,409,428 B1 | 8/2008 | Brabec | |
| 7,434,225 B2 | 10/2008 | Groetzner et al. | |
| 7,527,558 B2 | 5/2009 | Lavoie | |
| 7,543,181 B2 | 6/2009 | Buxton | |
| 7,565,451 B2 | 7/2009 | Cabrera | |
| 7,631,108 B2 | 12/2009 | Kesselman | |
| 7,640,249 B2 | 12/2009 | Smits | |
| 7,711,788 B2 | 5/2010 | Lev Ran et al. | |
| 7,743,109 B2 | 6/2010 | Kaminsky et al. | |
| 7,783,610 B2 | 8/2010 | Lin et al. | |
| 7,802,263 B2 | 9/2010 | Fuchs | |
| 7,865,684 B2 | 1/2011 | Michaylov | |
| 7,937,364 B1* | 5/2011 | Chandrasekaran et al. | 707/636 |
| 7,945,631 B2 | 5/2011 | Chkodrov et al. | |
| 8,095,935 B2 | 1/2012 | Paramasivam et al. | |
| 8,301,706 B2 | 10/2012 | Paramasivam | |
| 2001/0023482 A1 | 9/2001 | Wray | |
| 2002/0087548 A1* | 7/2002 | Tasalloti | 707/10 |
| 2002/0116538 A1 | 8/2002 | Chen | |
| 2004/0162901 A1 | 8/2004 | Mangipudi et al. | |
| 2004/0186918 A1 | 9/2004 | Lonnfors | |
| 2004/0268357 A1 | 12/2004 | Joy et al. | |
| 2005/0147057 A1 | 7/2005 | LaDue | |
| 2005/0195820 A1 | 9/2005 | Betts | |
| 2005/0219617 A1 | 10/2005 | Krishnaswamy | |
| 2005/0278270 A1 | 12/2005 | Carr | |
| 2006/0053163 A1 | 3/2006 | Liu | |
| 2006/0080579 A1 | 4/2006 | Rothman | |
| 2006/0085797 A1 | 4/2006 | Connelly | |
| 2006/0101064 A1 | 5/2006 | Strong | |
| 2006/0136367 A1 | 6/2006 | Todd | |
| 2006/0146879 A1 | 7/2006 | Anthias et al. | |
| 2006/0149865 A1 | 7/2006 | Kirstein | |
| 2006/0155862 A1 | 7/2006 | Kathi et al. | |
| 2006/0187902 A1 | 8/2006 | Birch | |
| 2006/0230062 A1 | 10/2006 | Roy-Chowdhury et al. | |
| 2007/0005613 A1 | 1/2007 | Singh et al. | |
| 2007/0005640 A1 | 1/2007 | Klein | |
| 2007/0027928 A1 | 2/2007 | Majumdar | |
| 2007/0109592 A1 | 5/2007 | Parvathaneni et al. | |
| 2008/0086567 A1 | 4/2008 | Langen et al. | |
| 2008/0187004 A1 | 8/2008 | Johnson | |
| 2008/0288954 A1 | 11/2008 | Fuchs | |
| 2009/0132671 A1 | 5/2009 | Chkodrov et al. | |
| 2009/0133036 A1 | 5/2009 | Allen | |
| 2009/0133037 A1 | 5/2009 | Allen | |
| 2009/0199208 A1 | 8/2009 | Pinto | |
| 2009/0216793 A1 | 8/2009 | Szyperski | |
| 2009/0222794 A1 | 9/2009 | Pinto | |
| 2009/0282396 A1 | 11/2009 | Boyer | |
| 2009/0319911 A1 | 12/2009 | McCann et al. | |
| 2009/0320044 A1 | 12/2009 | Dar et al. | |

OTHER PUBLICATIONS

Office Action dated Mar. 12, 2012 cited in U.S. Appl. No. 12/019,041.

Aaron Skonnard, Pluralsight, "A Developer's Introduction to Windows Communication Foundation (wcf).net 4 Beta 1", Jul. 2009, 57 pages.

U.S. Appl. No. 12/767,091, Jun. 25, 2012, Notice of Allowance.

U.S. Appl. No. 13/432,341, filed Mar. 28, 2012, Allen.

Office Action dated Apr. 5, 2012 cited in U.S. Appl. No. 12/018,401.

U.S. Appl. No. 12/767,091, filed Apr. 26, 2010, Allen.

U.S. Appl. No. 12/727,066, filed Mar. 18, 2010, Allen.

Bhatti, Nina T., et al., "A System for Constructing Configurable High-Level Protocols", 1995, 13 pages.

Lee, Whay Sing, et al., "An Efficient, Protected Message Interface", Nov. 1998, pp. 69-75.

Nodine, Marian, et al., "Task Coordination Paradigms for Information Agents", Lecture Notes in Computer Science; vol. 1986, Proceedings of the 7th International Workshop on Intelligent Agents VII. Agent Theories Architectures and Languages, Year of Publication: 2000, 15 pages.

Onion, Fritz, "State Management in asp.net", informIT, May 30, 2003, 5 pages.

Allen, Nicholas, "Nicholas Allen's Indigo Blog—Future of Queuing", Windows Communication Foundation from the Inside, Dec. 1, 2008, 2 pages.

Office Action dated Jun. 27, 2012 cited in U.S. Appl. No. 12/727,066.

Ceponiene, Lina, et al., "Transformation from Requirements to Design for Service Oriented Information Systems", ADBIS Research Communications, 2005, pp. 164-177.

Arbab, Farhad, "The Influence of Coordination on Program Structure", 1997 IEEE, pp. 300-309.

Zambonelli, Franco, et al., "Programmable Coordination Infrastructures for Mobility", 2001, 5 pages.

Arbab, Farhad, et al., "Coordination through Channel Composition", 2002, LNCS 2315, pp. 22-39.

"Castro, Eva M., et al., Departamento de Ingenieria de Sistemas Telematicos Universidad Politecnica de Madrid dit.upm, ""Reliable Multicast for Coordination of Cooperative Applications""", http://jungla.dit.upm.es/~ecastro/ReliableMulticast/rmulticast.html, 1999, 1 page."

Guermouche, Abdou, et al., "A study of various load information exchange mechanisms for a distributed application using dynamic scheduling" Jan. 2005, 16 pages.

Albrecht, Jeannie, et al., "Remote Control: Distributed Application Configuration, Management, and Visualization with Plush", 2007, 16 pages.

Office Action dated Oct. 5, 2011 cited in U.S. Appl. No. 12/019,041.

Office Action dated Oct. 13, 2011 cited in U.S. Appl. No. 12/018,401.

U.S. Appl. No. 13/655,162, filed Oct. 18, 2012, Paramasivam.

Load-Balancing for MySQL http://diku.dk/publikationer/tekniske.rapporter/rapporter/03-1.pdf (67 pages) Fall 2003—Dennis haney & Klaus S. Madsen.

Planning for Reliability and High Availability http://msdn.microsoft.com/en-us/library/ms942932.aspx (32 pages) 2008—Microsoft Coorporation. [Retrieved from the internet May 21, 2008].

Distributed Computing with BEA WebLogic Server http://www-db.cs.wisc.edu/cidr/cidr2003/program/p26.pdf (11 pages) Jan. 5-8, 2003—Dean Jacobs—BEA Systems.

U.S. Appl. No. 12/484,741, Jun. 27, 2012, Notice of Allowance.

Notice of Allowance mailed Jan. 4, 2013 cited in U.S. Appl. No. 12/727,066.

(56) References Cited

OTHER PUBLICATIONS

Office Action dated Sep. 28, 2012 cited in U.S. Appl. No. 12/018,401.
Office Action dated Oct. 3, 2012 cited in U.S. Appl. No. 12/019,041.
Notice of Allowance mailed Nov. 2, 2012 cited in U.S. Appl. No. 12/727,066.
Office Action dated Apr. 4, 2013 cited in U.S. Appl. No. 12/019,041.
Notice of Allowance dated Apr. 10, 2013 cited in U.S. Appl. No. 12/018,401.
Office Action dated Apr. 12, 2013 cited in U.S. Appl. No. 13/655,162.
Notice of Allowance dated May 20, 2013 cited in U.S. Appl. No. 12/727,066.
Notice of Allowance dated Aug. 12, 2013 cited in U.S. Appl. No. 13/655,162.

* cited by examiner

DISPATCH MECHANISM FOR COORDINATING APPLICATION AND COMMUNICATION MEDIUM STATE

CROSS-REFERENCE TO RELATED APPLICATIONS

This application is a continuation-in-part of U.S. patent application Ser. No. 12/018,401, entitled "Coordinating Resources Using A Volatile Network Intermediary", filed Jan. 23, 2008, which claims the benefit of U.S. Provisional Application No. 60/988,737, entitled "Using A Volatile Network Intermediary To Coordinate Resources", filed Nov. 16, 2007 and which claims the benefit of U.S. Provisional Application No. 60/988,736, entitled "Coordinating Application State And Communication Medium State", filed Nov. 16, 2007, all of which are incorporated herein in their entirety. This application is a continuation-in-part of U.S. patent application Ser. No. 12/019,041, entitled "Coordinating Application State And Communication Medium State", filed Jan. 24, 2008, which claims the benefit of U.S. Provisional Application No. 60/988,736, entitled "Coordinating Application State And Communication Medium State", filed Nov. 16, 2007, both of which are incorporated herein in their entirety.

BACKGROUND

Background and Relevant Art

Computer systems and related technology affect many aspects of society. Indeed, the computer system's ability to process information has transformed the way we live and work. Computer systems now commonly perform a host of tasks (e.g., word processing, scheduling, accounting, etc.) that prior to the advent of the computer system were performed manually. More recently, computer systems have been coupled to one another and to other electronic devices to form both wired and wireless computer networks over which the computer systems and other electronic devices can transfer electronic data. Accordingly, the performance of many computing tasks are distributed across a number of different computer systems and/or a number of different computing environments.

As computerized systems have increased in popularity, so have the complexity of the software and hardware employed within such systems. In general, the need for seemingly more complex software continues to grow, which further tends to be one of the forces that push greater development of hardware. For example, if application programs require too much of a given hardware system, the hardware system can operate inefficiently, or otherwise be unable to process the application program at all. Recent trends in application program development, however, have removed many of these types of hardware constraints at least in part using distributed application programs.

In general, distributed application programs comprise components that are executed over several different hardware components. Distributed application programs are often large, complex, and diverse in their implementations. One can appreciate, that while this ability to combine processing power through several different computer systems can be an advantage, there are various complexities associated with distributing application program modules.

For example, applications can change internal state in accordance with the contents of messages received over a communication medium. In addition to application state change, the communication medium can also change state (e.g., in that it no longer contains the message). Generally, the process of receiving a message involves at least two steps: a) an application accesses message content and b) the state of the communication medium is updated. When these two steps are coupled into a single receive function, coordinating the respective state changes in the application and the communication medium can be difficult.

For example, the delivery of a message alters the state of the communication medium in that the message is no longer present in the communication medium following delivery. The receipt of a message also alters the state of an application determined by the particular custom logic of that application. The custom logic may require access to the contents of the message being delivered. Thus, processing difficulties (e.g., duplicate and inappropriate processing by competing application consumers) can occur when access to the contents of a message is coupled to the state change in the communication medium.

In some environments, the difficulties are partially addressed by allowing the application to execute the receive function on the communication medium and its own internal state change under the same two-phase commit transaction. However, under such circumstance the application is unable to use two-phase commit transactions as part of the process of deciding on its final state. This would happen, for example, if an application was executing multiple processing attempts to arrive at the final state.

BRIEF SUMMARY

The present invention extends to methods, systems, and computer program products for coordinating application state and communication medium state. In some embodiments, state is coordinated between a communication medium and an application in accordance with the state coordination pattern. A dispatcher sends a message request to the communication medium. The message request requests a next available message from the communication medium on behalf of the application. The dispatcher receives a view of the content of a message from the communication medium. Receiving the content view indicates that the communication medium has locked the message for access by the dispatcher.

The dispatcher offers the content view to the application. The application attempts to update application state for the application based on the content view. The dispatcher observes a signal related to the attempted application state update from the application. The dispatcher sends a further signal to signal the communication medium how to update communication medium state (e.g., to delete or unlock the message) on behalf of the application. The further signal is based on the observed signal and in accordance with the state coordination pattern.

In other embodiments, when the dispatcher offers a content view to an application, it also sends a communication proxy to the application. The communication proxy provides sufficient information for the application to communicate with the communication medium. The application communicates with the communication proxy to indicate how to update communication medium state.

In further embodiments, an application uses a scheduler and shared storage to provide an execution (e.g., continuation based) runtime for coordinating state between a communication medium and the application in accordance with a state coordination pattern. The application provides a plurality of executable activities to the scheduler. The plurality of executable activities include a receive activity and one or more state update activities.

The scheduler schedules the receive activity for execution. The receive activity receives a content view of a message along with a communication proxy from the dispatcher. The message is a message the dispatcher accessed on behalf of the application in accordance with the state coordination pattern. The communication proxy provides sufficient information for the application to communicate with the communication medium in accordance with the state coordination pattern.

A shared storage location is initialized with a receive context to communicate with the communication medium based on the communication proxy. The shared storage location is accessible by other activities of the application to communicate with the communication medium. One or more of the plurality of executable activities is initialized to update the application state of the application from the content view. The initialized executable activities have access to the shared storage location with the receive context.

The scheduler schedules a first state update activity for execution, the first state update activity included in the plurality of executable activities. The first state update activity is executed to attempt to update the application state of the application. A signal is sent to the receive context. The signal indicates how the communication medium state is to be updated based on the results of attempting to update the application state and in accordance with the state coordination pattern. The receive context forwards the signal for delivery to the communication medium.

In some of these further embodiments, if the first state update activity is not successful in updating application state, one or more alternative state update activities are executed prior to signaling how the communication state is to be updated.

This summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages of the invention will be set forth in the description which follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION

The present invention extends to methods, systems, and computer program products for coordinating application state and communication medium state. In some embodiments, state is coordinated between a communication medium and an application in accordance with the state coordination pattern. A dispatcher sends a message request to the communication medium. The message request requests a next available message from the communication medium on behalf of the application. The dispatcher receives a view of the content of a message from the communication medium. Receiving the content view indicates that the communication medium has locked the message for access by the dispatcher.

The dispatcher offers the content view to the application. The application attempts to update application state for the application based on the content view. The dispatcher observes a signal related to the attempted application state update from the application. The dispatcher sends a further signal to signal the communication medium how to update communication medium state (e.g., to delete or unlock the message) on behalf of the application. The further signal is based on the observed signal and in accordance with the state coordination pattern.

In other embodiments, when the dispatcher offers a content view to an application, it also sends a communication proxy to the application. The communication proxy provides sufficient information for the application to communicate with the communication medium. The application communicates with the communication proxy to indicate how to update communication medium state.

In further embodiments, an application uses a scheduler and shared storage to provide an execution (e.g., continuation based) runtime for coordinating state between a communication medium and the application in accordance with a state coordination pattern. The application provides a plurality of executable activities to the scheduler. The plurality of executable activities include a receive activity and one or more state update activities.

The scheduler schedules the receive activity for execution. The receive activity receives a content view of a message along with a communication proxy from the dispatcher. The message is a message the dispatcher accessed on behalf of the application in accordance with the state coordination pattern. The communication proxy provides sufficient information for the application to communicate with the communication medium in accordance with the state coordination pattern.

A shared storage location is initialized with a receive context to communicate with the communication medium based on the communication proxy. The shared storage location is accessible by other activities of the application to communicate with the communication medium. One or more of the plurality of executable activities is initialized to update the application state of the application from the content view. The initialized executable activities have access to the shared storage location with the receive context.

The scheduler schedules a first state update activity for execution, the first state update activity included in the plurality of executable activities. The first state update activity is executed to attempt to update the application state of the application. A signal is sent to the receive context. The signal indicates how the communication medium state is to be updated based on the results of attempting to update the application state and in accordance with the state coordination pattern. The receive context forwards the signal for delivery to the communication medium.

In some of these further embodiments, if the first state update activity is not successful in updating application state, one or more alternative state update activities are executed prior to signaling how the communication state is to be updated.

Embodiments of the present invention may comprise or utilize a special purpose or general-purpose computer including computer hardware, such as, for example, one or more processors and system memory, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: computer storage media and transmission media.

Computer storage media includes RAM, ROM, EEPROM, CD-ROM or other optical disk storage, magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above should also be included within the scope of computer-readable media.

Further, upon reaching various computer system components, program code means in the form of computer-executable instructions or data structures can be transferred automatically from transmission media to computer storage media (or vice versa). For example, computer-executable instructions or data structures received over a network or data link can be buffered in RAM within a network interface module (e.g., a "NIC"), and then eventually transferred to computer system RAM and/or to less volatile computer storage media at a computer system. Thus, it should be understood that computer storage media can be included in computer system components that also (or even primarily) utilize transmission media.

Computer-executable instructions comprise, for example, instructions and data which, when executed at a processor, cause a general purpose computer, special purpose computer, or special purpose processing device to perform a certain function or group of functions. The computer executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Generally, each of the components depicted in the various Figures can be part of computer system. Various different computer systems can be connected to one another over (or be part of) a network, such as, for example, a Local Area Network ("LAN"), a Wide Area Network ("WAN"), and even the Internet. Accordingly, the various computer systems as well as any other connected computer systems and their components, can create message related data and exchange message related data (e.g., Internet Protocol ("IP") datagrams and other higher layer protocols that utilize IP datagrams, such as, Transmission Control Protocol ("TCP"), Hypertext Transfer Protocol ("HTTP"), Simple Mail Transfer Protocol ("SMTP"), etc.) over the network.

Figure 1:
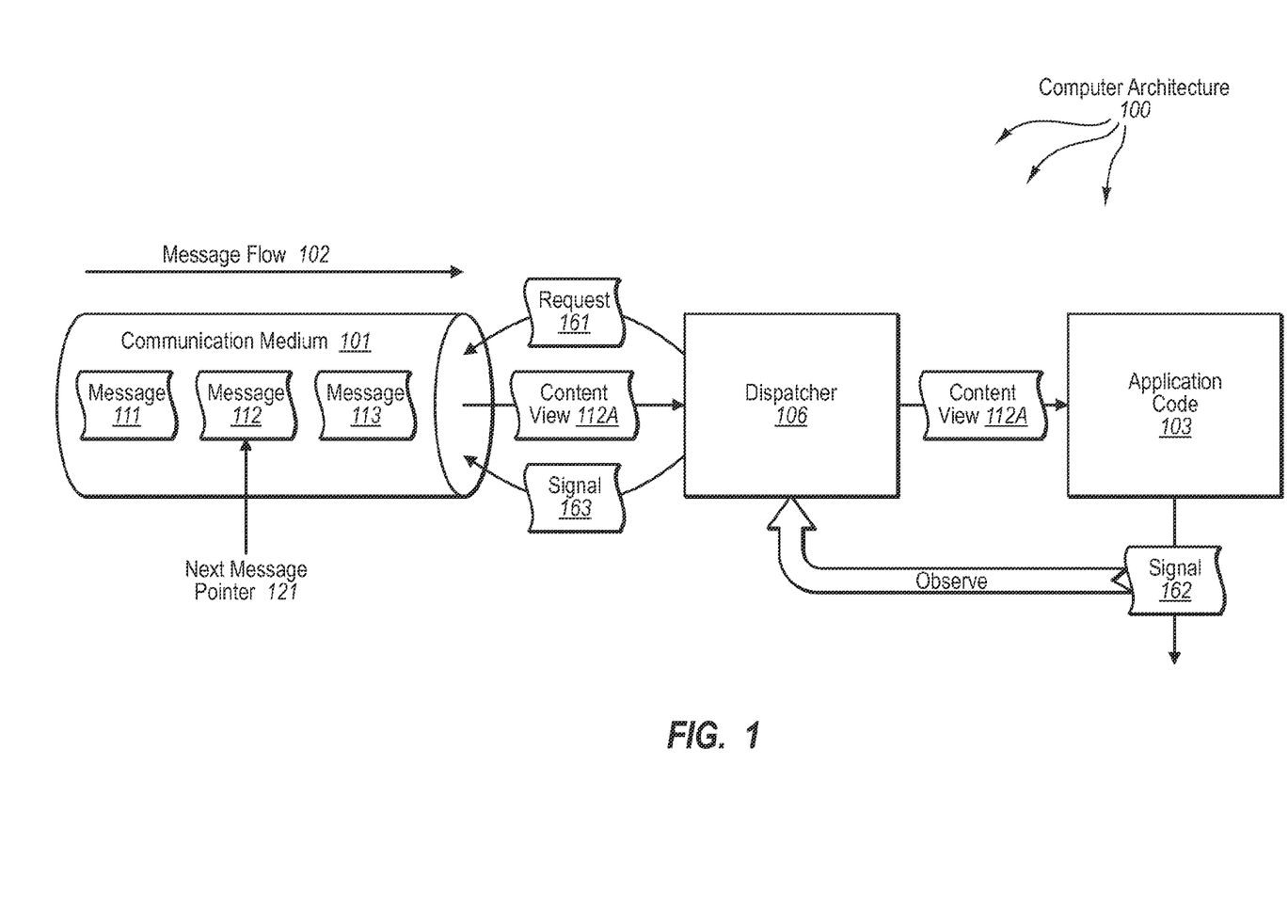
FIG. 1 illustrates an example computer architecture that facilitates coordinating application and communication medium state.

Turning now to FIG. 1, FIG. 1 illustrates an example computer architecture 100 that facilitates coordinating application and communication medium state. As depicted, FIG. 1 includes communication medium 101, dispatcher 106, and application code 103.

Communication medium 101 can be virtually any type of medium, such as, for example, a queue system or database, that provides messages to applications. Thus, communication medium 101 can carry message flow 102. Message flow 102 includes a plurality of messages including messages 111, 112, and 113.

Each of messages 111, 112, and 113 can be an envelope that contains message headers and a message body with message content. For example, a message object can be a SOAP envelope that includes XML instructions in both a message header and message body. Messages can be associated with local message properties. Local message properties can indicate temporary message state not necessarily derived from transfer of the message. In some embodiments, local message properties are associated with messages by being attached to the messages.

The messages of message flow 102 can be sent from some other network connectable system or device for delivery to an application (of which application code 103 is one instantiation). Alternately, message flow 102 can be sent from another application on the same computer system as the application or even between different consumers of the application. That is, one consumer of the application can send a message to communication medium 101. Subsequently, another consumer of the application can receive the message from communication medium 101. For example, a message can be sent from another instantiation of the application to communication medium 101 and subsequently received at application code 103.

Thus, an application can potentially include a plurality of competing consumers, which compete for messages being received at the application. For example, consumers, including application code 103, can be configured to process purchase orders included in message flow 102. For any number of reasons, such as, for example, scalability, the plurality of consumers can be physically distributed across a number of nodes. Each consumer can have a copy of application code to compete for message delivered from communication medium 101. Thus, there can be several instances of the application (e.g., one of which is application code 103) running concurrently, competing with each other for messages from communication medium 101.

In such an environment, one application or competing consumer of an application can examine a message at a time. Communication medium 101 can lock a message that is being examined (by an application or competing consumer of an application). For example, communication medium 101 can lock message 113 for an application or competing consumer of an application.

When a message is locked, dispatcher 106, other applications, and/or competing consumers see the next message in a message flow as the message immediately behind the locked message. Communication medium 101 can maintain a next message pointer to point to the next available message (or message that isn't already being examined) in message flow 102. For example, communication medium 101 can maintain next message pointer 121. Thus, when message 113 is already being examined (whether it be by dispatcher 106, another application, or a consumer in competition with application code 103), next message pointer 121 points to message 112. As such, message 112 may be the next message available to dispatcher 106 and/or application code 103.

Accordingly, applications (e.g., dispatcher 106) are permitted to examine (or "peek" at) message 112 while communication medium 101 maintains a lock on message 113. After a state transition, an application can signal communication medium 101 to delete message 113, if the application successfully accepts message 113. A delete signal completes the successful receipt of a message at an application. Alternately, an application can also signal communication medium 101 to release the lock of (i.e., unlock) message 113, if the application cannot accept the message 113. An unlock completes an unsuccessful receipt of a message.

When an application consumes a message, a state change to both communication medium 101 and the application occurs. Accordingly, communication medium 101 can support a state coordination pattern. In some embodiments, communication medium 101 supports a peek lock state coordination pattern that includes: a) an application (e.g., dispatcher 106) accessing a view of message contents (i.e., a "peek") and b) locking the message until the application signals how the message is to be handled (e.g., deleted or unlocked)

In some embodiments, application code 103 does not natively support communication state updates in accordance with and/or is unaware of the (e.g., peek lock) state coordination pattern of communication medium 101. Accordingly, dispatcher 106 interfaces with communication medium 101 and acts on behalf of application code 103 to participate in the state coordination pattern with communication medium 101. As such, dispatcher 106 can be configured to participate in a peek lock coordination pattern that provides application code 103 with a view of message contents (a "peek") and locks messages during the time the application is viewing the contents of the message.

Although application code 103 does not necessarily use the peek lock coordination pattern, application code 103 can support some basic messaging operations, such as, for example, indicating successful receipt of a message, indicating unsuccessful receipt of a message, indicating a successfully update to application state, and indicating an unsuccessful update to application state. Dispatcher 106 can observe signals related to these basic messaging operations. From these observed signals, dispatcher 106 can update the state of communication medium 101 in accordance with the peek lock (or other state) coordination pattern.

Figure 4:
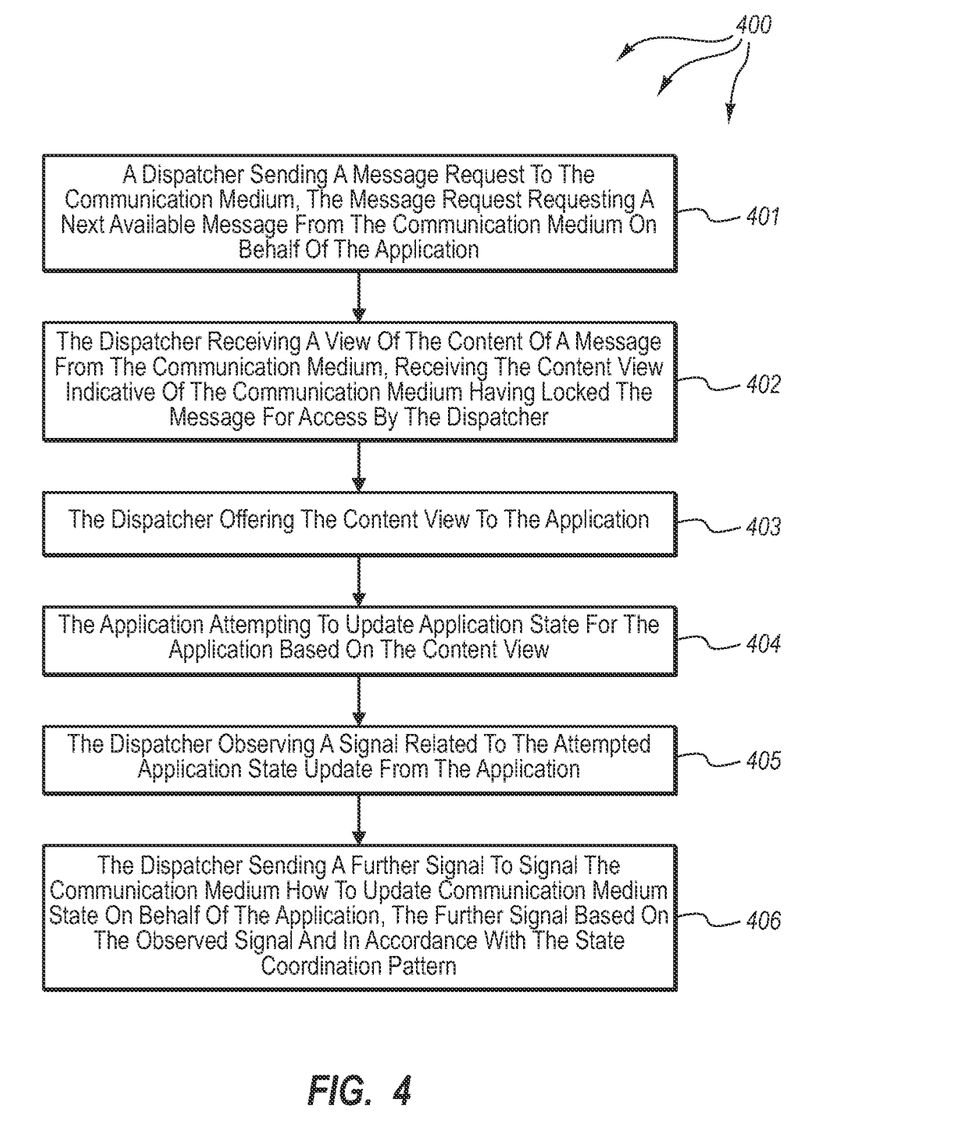
FIG. 4 illustrates a flow chart of an example method for coordinating application and communication medium state.

FIG. 4 illustrates a flow chart of an example method 400 for coordinating application and communication medium state. Method 400 will be described with respect to the components and data of computer architecture 100.

Method 400 includes an act of the dispatcher sending a message request to the communication medium, the message request requesting a next available message from the communication medium on behalf of the application (act 401). For example, dispatcher 106 can send request 161 to communication medium 101. Request 161 can request the next available message from communication medium 101 on behalf of application code 103.

Method 400 includes an act of the dispatcher receiving a view of the content of a message from the communication medium, receiving the content view indicative of the communication medium having locked the message for access by the dispatcher (act 402). For example, dispatcher 106 can receive content view 112A. Content view 112A can be a view of (or peek at) the contents of message 112. Receiving content view 112A, indicates to dispatcher 106 that communication medium 101 has locked message 112 for access by dispatcher 106.

Method 400 includes an act of the dispatcher offering the content view to the application (act 403). For example, dispatcher 106 can offer content view 112A to application code 103. Method 400 includes an act of the application attempting to update application state for the application based on the content view (act 404). For example, application code 103 can attempt to update application state based on content view 112A.

Method 400 includes an act of the dispatcher observing a signal related to the attempted application state update from the application (act 405). For example, dispatcher 106 can observe signal 162 related to the state update attempted by application code 103. Signal 162 can indicate, for example, whether application code 103 did or did not successfully update application state based on content view 112A. When application code 103 is aware of the state coordination pattern, dispatcher 106 can observe signal 162 subsequent to offering content view 112A to application code 103.

Method 400 includes an act of the dispatcher sending a further signal to signal the communication medium how to update communication medium state on behalf of the application, the further signal based on the observed signal and in accordance with the state coordination pattern (act 406). For example, dispatcher 106 can send signal 163 to communication medium 101. Signal 163 indicates how to update the state of communication medium 101 on behalf of application code 103. Signal 163 can be based on signal 162 and in accordance with a peek lock (or other state) coordination pattern used by communication medium 101. For example, if signal 162 indicates that the state update was successful, signal 163 can indicate that message 112 is to be deleted from communication medium 101. On the other hand, if signal 162 indicates that the state update was unsuccessful, signal 163 can indicate that message 112 is to be unlocked at communication medium 101 (and is thus again accessible to applications). In any case, next message pointer 121 can be appropriately updated.

In other embodiments, application code is aware of and supports the (e.g., peek lock) state coordination pattern of a communication medium. In these other embodiments, a dispatcher interfaces with the communication medium to access a message on behalf of application code. Subsequently, the application code signals how communication state is to be updated.

Figure 2:
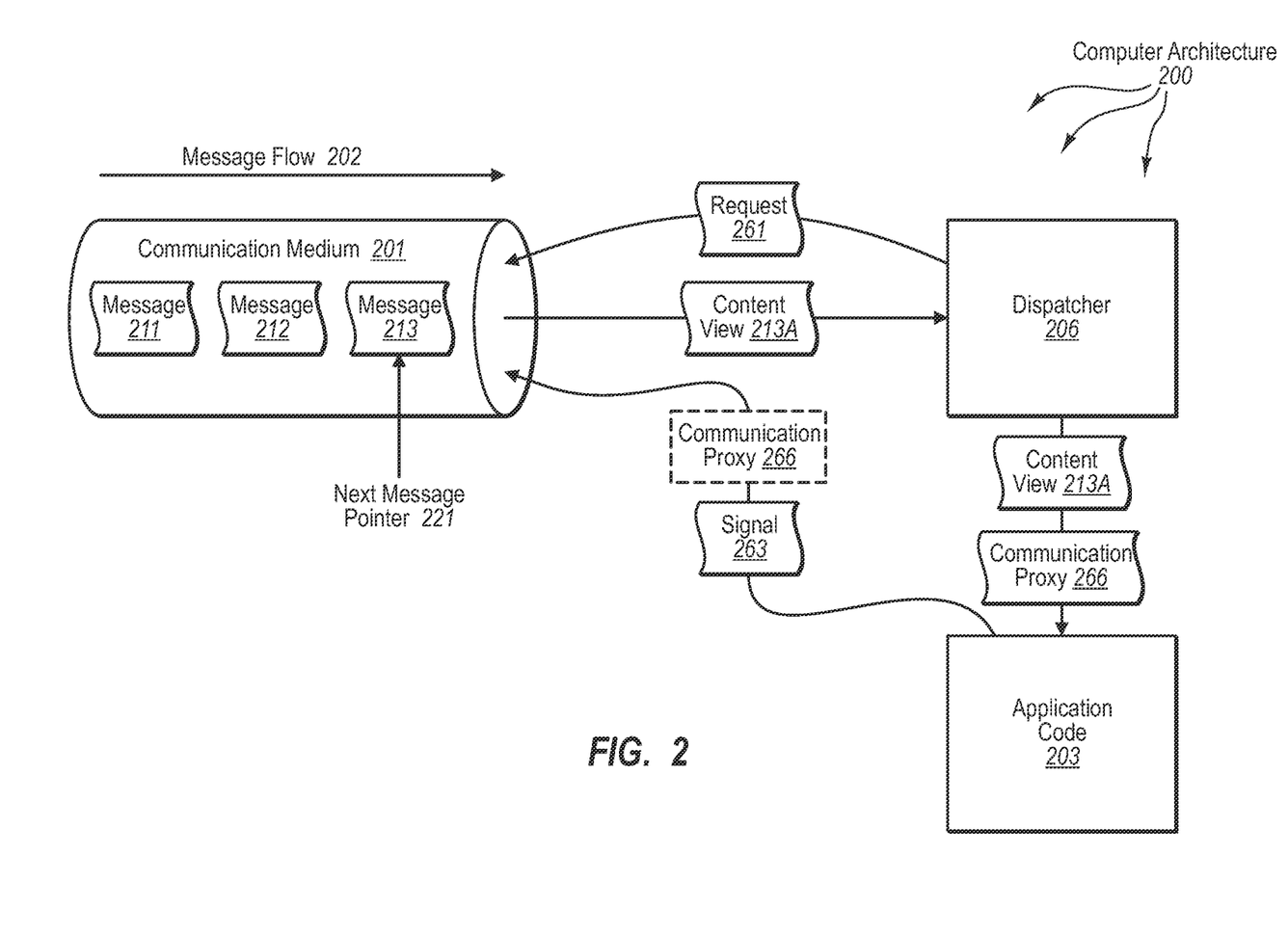
FIG. 2 illustrates another example computer architecture that facilitates coordinating application and communication medium state.

Turning to FIG. 2, FIG. 2 illustrates another computer architecture 200 that facilitates coordinating application and communication medium state. As depicted, computer architecture 200 includes communication medium 201, dispatcher 206, and application code 203. Communication medium 201 can be virtually any type of medium, such as, for example, a queue system or database, that provides messages to applications. Thus, communication medium 201 can carry message flow 202. Message flow 202 includes a plurality of messages including messages 211, 212, and 213. Message pointer 221 can point to the next available message (or message that isn't already being examined) in message flow 202.

Application code 203 is aware of and supports the (e.g., peek lock) state coordination pattern of communication medium 201. Dispatcher 206 can interface with communication medium 201 to access a message on behalf of application code 203. For example, dispatcher 206 can be configured to participate in a peek lock coordination pattern with communication medium 201. The peek lock coordination pattern provides application code 203 with a view of message contents (a "peek") and locks messages during the time application code 203 is viewing the contents of the message. Subsequently, application code 203 can send a signal to communication medium 201 indicating how the state of communication medium 201 is to be updated. For example, application code 203 can be configured to participate in the peek lock coordination pattern with communication medium 201 to indicate whether a message is to be deleted from or unlocked at communication medium 201.

Figure 5:
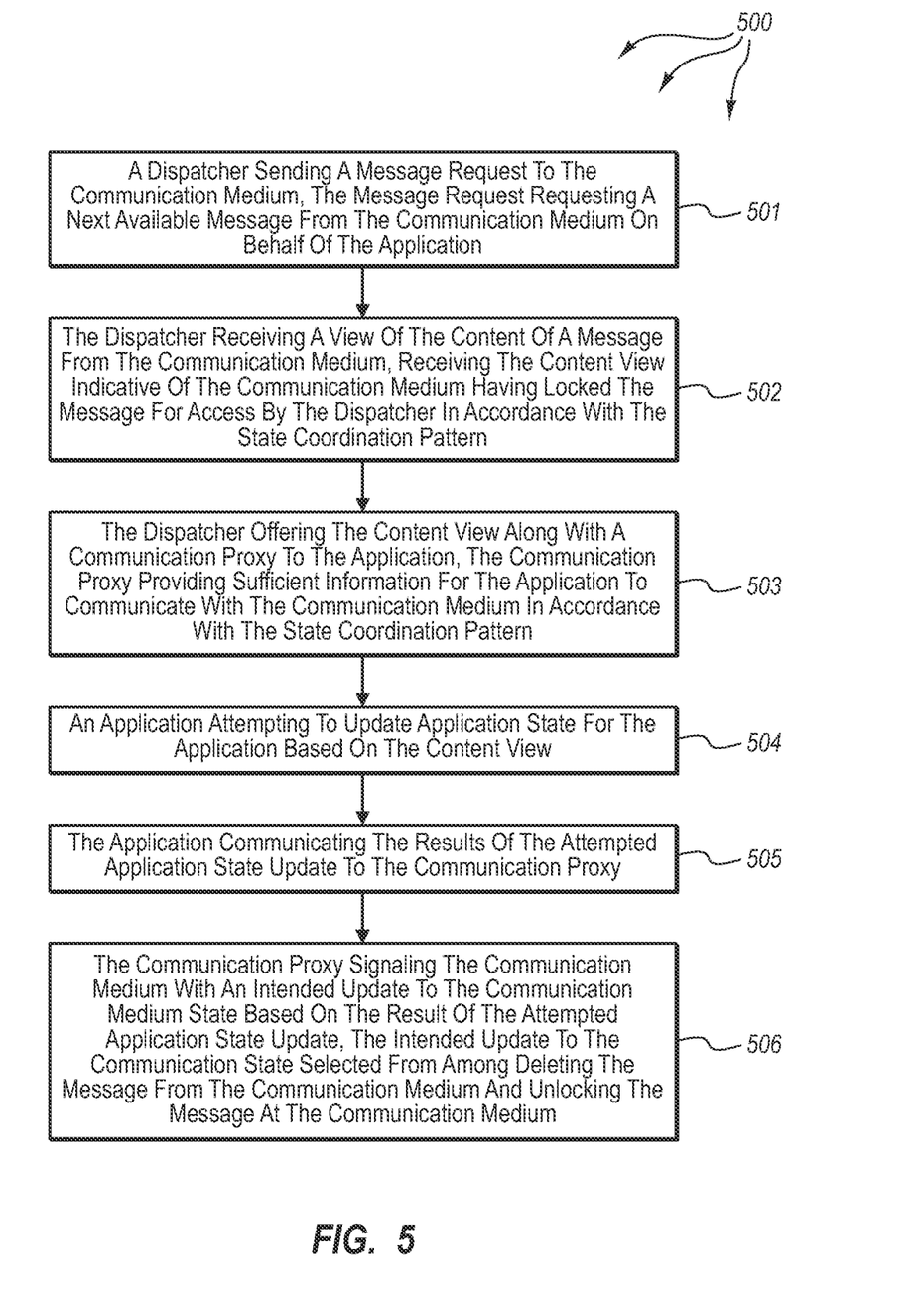
FIG. 5 illustrates a flow chart of another example method for coordinating application and communication medium state.

FIG. 5 illustrates a flow chart of an example method 500 for coordinating application and communication medium state. Method 500 will be described with respect to the components and data of computer architecture 200.

Method 500 includes an act of the dispatcher sending a message request to the communication medium, the message request requesting a next available message from the communication medium on behalf of the application (act 501). For example, dispatcher 206 can send request 261 to communication medium 201. Request 261 can be a request for the next available message from communication medium 201 on behalf of application code 203.

Method 500 includes an act of the dispatcher receiving a view of the content of a message from the communication medium, receiving the content view indicative of the communication medium having locked the message for access by the dispatcher in accordance with the state coordination pattern (act 502). For example, dispatcher 206 can receive content view 213A. Content view 213A can be a view of (or peek at) the contents of message 213. Receiving content view 213A, indicates to dispatcher 206 that communication medium 201 has locked message 213 for access by dispatcher 206.

Method 500 includes an act of the dispatcher offering the content view along with a communication proxy to the application, the communication proxy providing sufficient information for the application to communicate with the communication medium in accordance with the state coordination pattern (act 503). For example, dispatcher 206 can offer content view 213A and communication proxy 266 to application code 203. Communication proxy 266 provides sufficient information for application code 203 to communicate with communication medium 201 in accordance with the state (e.g., peek lock) coordination pattern. Dispatcher 206 can access and/or formulate communication proxy 266 based on information dispatcher 206 knows about (or receives from) communication medium 201.

Method 500 includes an act of the application attempting to update application state for the application based on the content view (act 504). For example, application code 203 can attempt to update application state based on content view 213A. Method 500 includes an act of the application communicating the results of the attempted application state update to the communication proxy (act 505). For example, application code 203 can communicate signal 263 (e.g., to or observed by communication proxy 266) to indicate whether application code 203 did or did not successfully update application state based on content view 213A.

Method 500 includes an act of the communication proxy signaling the communication medium with an intended update to the communication medium state based on the result of the attempted application state update, the intended update to the communication state selected from among deleting the message from the communication medium and unlocking the message at the communication medium (act 506). For example, communication proxy 266 can signal communication medium 201 with an intended update based on the results of application code 203 attempting to update application state. The intended update can indicate whether to delete message 213 from or unlock message 213 at communication medium 201.

The intended update can be based on signal 263 and in accordance with a peek lock (or other state) coordination pattern used by communication medium 201. For example, if signal 263 indicates that the state update was successful, the update can indicate that message 213 is to be deleted from communication medium 201. On the other hand, if signal 263 indicates that the state update was unsuccessful, the update can indicate that message 213 is to be unlocked at communication medium 201 (and is thus again accessible to applications). In any case, next message pointer 221 can be appropriately updated.

In further embodiments, coordination of application and communication medium state is facilitated with an execution (e.g., continuation based) runtime. A scheduler and shared storage provide an execution runtime for an application, including alternative paths of execution for processing messages. The application can be aware of and support the (e.g., peek lock) state coordination pattern of a communication medium. In these further embodiments, a dispatcher interfaces with the communication medium to access a message on behalf of application code. Subsequently, the application code signals how communication state is to be updated.

Figure 3:
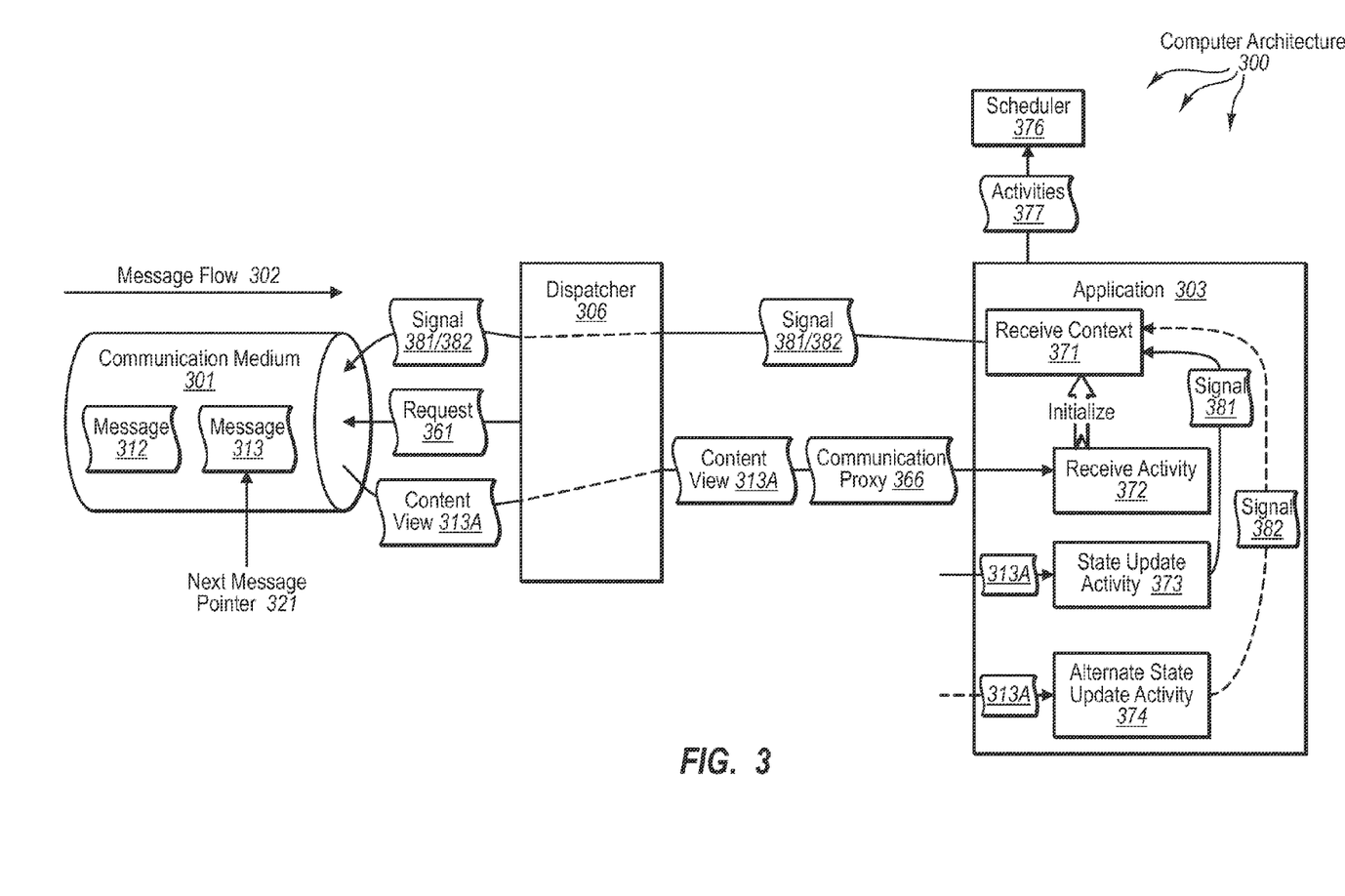
FIG. 3 illustrates a further example computer architecture that facilitates coordinating application and communication medium state.

Turning to FIG. 3, FIG. 3 illustrates another computer architecture 300 that facilitates coordinating application and communication medium state. As depicted, computer architecture 300 includes communication medium 301, dispatcher 306, and application 303. Communication medium 301 can be virtually any type of medium, such as, for example, a queue system or database, that provides messages to applications. Thus, communication medium 301 can carry message flow 302. Message flow 302 includes a plurality of messages including messages 312 and 213. Message pointer 321 can point to the next available message (or message that isn't already being examined) in message flow 302.

Application 303 is aware of and supports the (e.g., peek lock) state coordination pattern of communication medium 301. Dispatcher 306 can interface with communication medium 301 to access a message on behalf of application 303. For example, dispatcher 306 can be configured to participate in a peek lock coordination pattern with communication medium 301. The peek lock coordination pattern provides application 303 with a view of message contents (a "peek") and locks messages during the time application 303 is viewing the contents of the message. Subsequently, application 303 can send a signal to communication medium 301 indicating how the state of communication medium 301 is to be updated. For example, application 303 can be configured to participate in the peek lock coordination pattern with communication medium 301 to indicate whether a message is to be deleted from or unlocked at communication medium 301.

Scheduler 376 can schedule activities (e.g., activities in activities 377) for execution. The scheduled activities can be used to attempt to update application state for application 303. Alternate activities can be used to attempt to update application state. For example, if a first activity fails to appropriately update application state, a second alternative activity can then be executed to attempt to update application state.

The follow Extensible Application Markup Language ("XAML") code sample depicts an example of a sequence of activities that includes alternative activities:

```
<Sequence>
    <Sequence.Variables>
        <ReceiveContext x:Name="rcl"/>
    </Sequence.Variables>
    <ReceiveMessage ReceiveContext="[rcl]"/>
    <TryCatch>
        <TransactionScope>
            <Sequence>
                <UpdateState />
                <DeleteMessage ReceiveContext="[rcl]" />
            </Sequence>
        </TransactionScope>
        <TryCatch.Catch>
            <TransactionScope>
                <Sequence>
                    <AlternativeUpdate/>
                    <DeleteMessage ReceiveContext="[rcl]" />
                </Sequence>
            </TransactionScope>
        </TryCatch.Catch>
    </TryCatch>
</Sequence>
```

With the XAML code sample, a sequence activity contains a ReceiveMessage and a TryCatch activity. The Sequence activity contains the declaration of a ReceiveContext named "rcl" as one of its variables. This is the communication medium proxy. The dispatcher delivers a message to the ReceiveMessage activity. The TryCatch activity executes its Try block and if an error occurs, it will execute its Catch block. The TransactionScope activity provides an ambient transaction for the contained activities. The DeleteMessage activity triggers the delivery of the delete signal.

When this program executes, the ReceiveMessage registers a continuation that can be resumed by the dispatcher. When the dispatcher delivers the message augmented with the communication medium proxy, the proxy is stored into the ReceiveContext "rcl". When the Try block of the TryCatch activity executes, the UpdateState activity executes under a transaction provided by the TransactionScope activity. If the UpdateState activity encounters an error, the transaction is rolled back and the Catch block of the TryCatch activity executes. A new transaction is provided and the AlternativeUpate activity is executed. This is followed by the DeleteMessage activity which will deliver the delete signal to the communication medium through the bound ReceiveContext "rcl" under the second transaction.

Similar mechanisms can also be used in disparate control flow activities such as Flowchart, State Machine, etc.

Further, these activities can be packaged into higher level patterns for coordinating state in a continuation base runtime application with a communication medium that supports the peek lock mechanism. One example could be a ReceiveContextScope activity that delivers the delete signal upon successful completion. Another could be a ReceiveContextTryCatch that allows the user to model alternative updates to application state in a manner similar to structured error handling.

Figure 6:
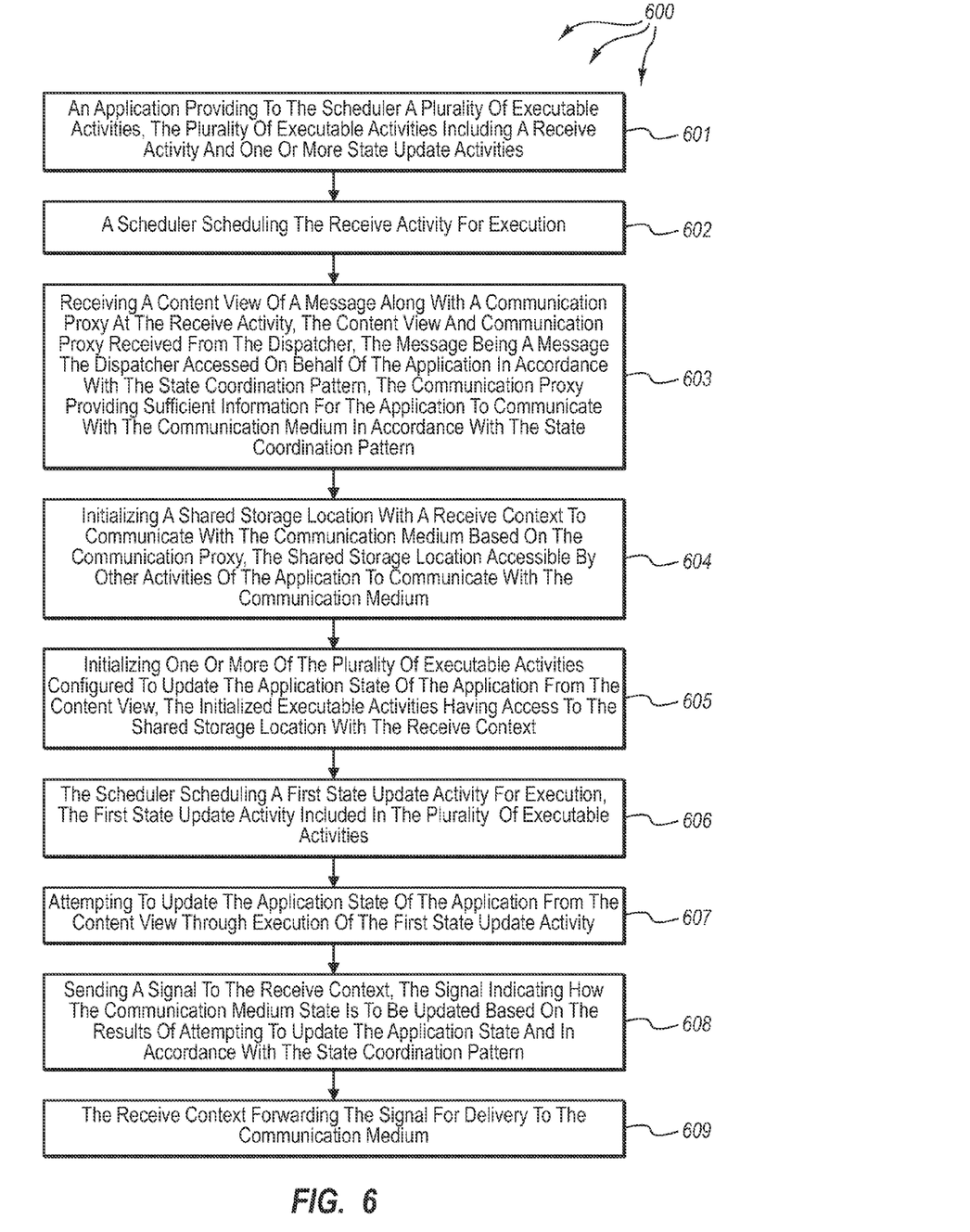
FIG. 6 illustrates a flow chart of a further example method for coordinating application and communication medium state.

FIG. 6 illustrates a flow chart of a method 600 for coordinating application and communication medium state. Method 600 will be described with respect to the components and data of computer architecture 300.

Method 600 includes an act of the application providing to the scheduler a plurality of executable activities, the plurality of executable activities including a receive activity and one or more state update activities (act 601). For example, application 303 can provide activities 377 to scheduler 376. Activities 377 include a receive activity and one or more state update activities. Method 600 includes an act of the scheduler scheduling the receive activity for execution (act 602). For example, scheduler 376 can schedule receive activity 372 for execution.

Method 600 includes an act of receiving a content view of a message along with a communication proxy at the receive activity, the content view and communication proxy received from the dispatcher, the message being a message the dispatcher accessed on behalf of the application in accordance with the state coordination pattern, the communication proxy providing sufficient information for the application to communicate with the communication medium in accordance with the state coordination pattern (act 603). For example, dispatcher 306 can send request 361 to communication medium 301. Request 361 can be a request for the next available message from communication medium 301 on behalf of application 303. In response to request 361, dispatcher 306 can receive content view 313A. Content view 313A can be view of (or peek at) the contents of message 313. Receiving content view 313A, indicates to dispatcher 306 that communication medium 301 has locked message 313 for access by dispatcher 306.

Dispatcher 306 can then offer content view 313A and communication proxy 366 to application 303. Communication proxy 366 provides sufficient information for application 303 to communicate with communication medium 301 in accordance with the state (e.g., peek lock) coordination pattern. Dispatcher 306 can access and/or formulate communication proxy 366 based on information dispatcher 306 knows about (or receives from) communication medium 301. Receive activity 372 can receive content view 313A and communication proxy 366 from dispatcher 306.

Method 600 includes an act of initializing a shared storage location with a receive context to communicate with the communication medium based on the communication proxy, the shared storage location accessible by other activities of the application to communicate with the communication medium (act 604). For example, receive activity 372 can initialize a shared storage location with receive context 371 to communicate with communication medium 301 based on communication proxy 366. The shared storage location is accessible to other activities of application 303 to communicate with communication medium 301. Receive activity 372 can also place content 313A in shared storage for access by other activities of application 303.

Method 600 includes an act of initializing one or more of the plurality of executable activities configured to update the application state of the application from the content view, the initialized executable activities having access to the shared storage location with the receive context (act 605). For example, application 303 can initialize state update activity 373 and alternate state update activity 374. Both of state update activity 373 and alternate state update activity 374 can be configured to update the application state of application 303 from content view 313A. Both of state update activity 373 and alternate state update activity 374 also have access to the shared storage location with receive context 371 and shared storage storing content view 313A.

Method 600 includes an act of the scheduler scheduling a first state update activity for execution, the first state update activity included in the plurality of executable activities (act 606). For example, scheduler 376 can schedule state update activity 373 for execution. Method 600 includes an act of attempting to update the application state of the application from the content view through execution of the first state update activity (act 607). For example, state update activity 373 can be executed to attempt to update application state for application 303 from content view 313A. State update activity 373 can access content view 313A from shared storage.

Method 600 includes an act of sending a signal to the receive context, the signal indicating how the communication medium state is to be updated based on the results of attempting to update the application state and in accordance with the state coordination pattern (act 608). For example, if state update activity 373 successfully updates the application state of application 303, state update activity 373 can send signal 381 to receive context 371. Signal 381 can indicate a successful state update such that message 313 is to be deleted from communication medium 301.

Scheduler 376 can also schedule alternate state update activity 374 for execution. For example, if state update activity 373 fails to successfully update the application state of application 303, alternate state update activity 374 can be executed to attempt to update application state for application 303 from content view 313A. Alternate state update activity 374 can access content view 313A from shared storage.

If alternate state update activity 374 successfully updates the application state of application 303, state update activity 374 can send signal 382 to receive context 371. Signal 382 can indicate a successful state update such that message 313 is to be deleted from communication medium 301.

If alternate state update activity 374 also fails to successfully update the application state of application 303, further alternate state update activities can be scheduled for execution. These alternate state update activities can also access content view 313A from shared storage. If no state update activity can successfully update the application state of application 303, a signal indicating that message 313 is to be unlocked can be sent to receive context 371.

Method 600 includes an act of the receive context forwarding the signal for delivery to the communication medium (act 609). For example, receive context 371 can forward signal 381, 382, etc. or a signal indicating message 313 is to be unlocked, to communication medium 301. The forwarded signal indicates how to update the state of communication medium 301 on behalf of application 303. The forwarded signal can be based on signal 381, 382, etc. or on a signal to unlock message 313, and in accordance with a peek lock (or other state) coordination pattern used by communication medium 301. For example, if signal 381 indicates that the state update was successful, the forwarded signal can indicate that message 313 is to be deleted from communication medium 301. On the other hand, when a signal indicates that the state update was unsuccessful, the forwarded signal can indicate that message 313 is to be unlocked at communication medium 301 (and is thus again accessible to applications). In any case, next message pointer 321 can be appropriately updated.

As previously described to some extent, various embodiments of the invention include one or more components participating in transactions to update communication state. For example, an application and a communication medium can participate in a transaction that delivers content view to the application and signals the communication medium to update communication medium state. More specifically at an application, a communication proxy can participate in a transaction that delivers a content view to the application and signals the communication medium to update communication medium state. From time to time, transactions can subsequently be rolled back. When a transaction is rolled back, the application can send another signal through the communication proxy to the communication medium, possibly using a different transaction.

Accordingly, embodiments of the invention provide mechanisms by which a dispatcher can enable application code to coordinate changes in application state with the consumption of messages from a communication medium. The coordination can be automatic where the dispatcher performs the coordination, or manual, where the coordination is performed more expressly by application code. Embodiments also include mechanisms by which applications targeting an execution (e.g., continuation based) runtime may compose alternative state transitions in the application with the peek lock protocol.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed:

1. At a computer system including one or more processors and system memory, the computer system also including a communication medium, a dispatcher, and an application, the dispatcher and the communication medium supporting a peek lock state coordination pattern to coordinate state transitions between the communication medium and any accessible applications, a method for coordinating state between the communication medium and the application in accordance with the peek lock state coordination pattern, the method comprising:

an act of the dispatcher interposed between an application and a communication medium sending a message request to the communication medium, the message request requesting a next available message from the communication medium on behalf of the application and which initiates a lock of the next available message by the communication medium;

an act of the dispatcher receiving a view of content of a message comprising the next available message from the communication medium which has been locked by the communication medium following the response to the request from the dispatcher, wherein the dispatcher receiving the content view is indicative of the communication medium having locked the message at the communication medium for access by the dispatcher and such that the message will remain locked at the communication medium to prevent any additional access to the message directly from the communication medium until a dispatcher signal is sent to the communication medium from the dispatcher that indicates that the message is to be unlocked or deleted according to the peek lock state coordination pattern;

an act of the dispatcher offering the content view to the application, even though the message remains locked at the communication medium;

an act of the dispatcher observing an application signal, the application signal indicating whether the application successfully updated an application state for the application based on the content view;

wherein the application does not natively support communication state updates or is unaware of the peek and lock state coordination pattern of the communication medium, such that the application is unable to update the communication medium state; and an act of the dispatcher sending a dispatcher signal to the communication medium, the dispatcher signal indicating how the communication medium is to update the communication medium state on behalf of the application, the dispatcher signal being based on the observed signal and in accordance with the peek lock state coordination pattern, the dispatcher signal indicating that the next available message is to be deleted when the application signal indicates the application state was successfully updated and the dispatcher signal indicating that the next available message is to be unlocked at the communication medium when the application signal indicates that updating the application state was unsuccessful.

2. The method as recited in claim 1, wherein the application is not aware of the supported state coordination pattern, and wherein the act of the dispatcher sending the dispatcher signal comprises an act of the dispatcher signaling the communication medium to delete the message.

3. The method as recited in claim 1, wherein the application is not aware of the supported state coordination pattern, and wherein the act of the dispatcher offering the content view to the application and the act of the dispatcher sending the dispatcher signal comprises an act of the application and communication medium participating in a transaction that delivers the content view to the application and signals the communication medium to delete the message.

4. The method as recited in claim 1, wherein the application is aware of the supported state coordination pattern, and wherein the act of the dispatcher sending the dispatcher signal comprises an act of the dispatcher sending a further signal to the communication medium indicating how to update communication medium state subsequent to offering the content view to the application; and wherein the act of the dispatcher sending the dispatcher signal to the communication medium indicating how to update communication medium state subsequent to offering the content view to the application comprises an act of the dispatcher signaling the communication medium how to update communication medium state based on the results of an attempt to update application state based on the content view.

5. The method as recited in claim 4, wherein the act of the dispatcher offering the content view to the application and the act of the dispatcher sending the dispatcher signal comprise an act of the application and communication medium participating in a transaction that delivers the content view to the application and signals the communication medium to update communication medium state.

6. The method as recited in claim 4, wherein an act of the dispatcher signaling the communication medium how to update communication medium state based on the results of an attempt to update application state based on the content view comprises an act of the dispatcher signaling the communication medium to delete the message in response to the dispatcher observing that the application successfully received the content view.

7. The method as recited in claim 4, wherein an act of the dispatcher signaling the communication medium how to update communication medium state based on the results of an attempt to update application state based on the content view comprises an act of the dispatcher signaling the communication medium to unlock the message in response to the dispatcher observing that the application did not successfully receive the content view, unlocking the message making the message available to the other software components.

8. At a computer system including one or more processors and system memory, the computer system also including a communication medium, a dispatcher, and an application, the dispatcher, the application, and the communication medium supporting a peek lock state coordination pattern to coordinate state transitions between the communication medium and the applications, a method for coordinating state between the communication medium and the application in accordance with the peek lock state coordination pattern, the method comprising:

an act of the dispatcher interposed between an application and a communication medium sending a message request to the communication medium, the message request requesting a next available message from the communication medium on behalf of the application and which initiates a lock of the next available message by the communication medium;

an act of the dispatcher receiving a view of content of a message comprising the next available message from the communication medium which has been locked by the communication medium following the response to the request from the dispatcher, wherein the dispatcher receiving the content view is indicative of the communication medium having locked the message at the communication medium for access by the dispatcher in accordance with a peek lock state coordination pattern, and such that the message will remain locked at the communication medium to prevent any additional access to the message directly from the communication medium until an intended update is sent to the communication medium from a communication proxy that indicates that the message is to be unlocked or deleted according to the peek lock state coordination pattern;

an act of the dispatcher offering the content view along with the communication proxy to the application, the communication proxy providing sufficient information for the application to communicate with the communication medium in accordance with the peek lock state coordination pattern;

wherein the application attempts to update application state for the application based on the content view and thereafter communicates results of the attempted application state update to the communication proxy; and wherein the communication proxy signals the communication medium with the intended update to a communication medium state based on the result of the attempted application state update, the intended update to the communication state being selected from among deleting the message from the communication medium and unlocking the message at the communication medium.

9. The method as recited in claim 8, wherein the method further includes the application and communication medium participating in a transaction that delivers the content view to the application and that results in the communication proxy signaling the communication medium to update communication medium state with the intended update.

10. The method as recited in claim 9, further comprising:
an act of the transaction subsequently being rolled back; and
wherein the application sends a new signal through the communication proxy with the intended update to the communication medium.

11. The method as recited in claim 8, wherein the results of the attempted application state update indicate that the application successfully received the content view of the message; and
wherein the intended update indicates that the communication medium is to delete the message.

12. At a computer system including one or more processors and system memory, the computer system also including a communication medium, a dispatcher, and an application, the dispatcher, the application, and the communication medium supporting a state coordination pattern to coordinate state transitions between the communication medium and the applications, the application using a scheduler and shared storage to provide an execution runtime, a method for coordinating state between the communication medium and the application in accordance with the state coordination pattern, the method comprising:

an act of the application providing to the scheduler a plurality of executable activities, the plurality of executable activities including a receive activity and one or more state update activities;

an act of the scheduler scheduling the receive activity for execution;

an act of receiving a content view of a message along with a communication proxy at the receive activity, the content view and communication proxy received from the dispatcher, the message being a message the dispatcher accessed on behalf of the application in accordance with the state coordination pattern, the communication proxy providing sufficient information for the application to communicate with the communication medium in accordance with the state coordination pattern;

an act of initializing a shared storage location with a receive context to communicate with the communication medium based on the communication proxy, the shared storage location accessible by other activities of the application to communicate with the communication medium;

an act of initializing one or more of the plurality of executable activities configured to update the application state of the application from the content view, the initialized executable activities having access to the shared storage location with the receive context;

an act of the scheduler scheduling a first state update activity for execution, the first state update activity included in the plurality of executable activities;

an act of attempting to update the application state of the application from the content view through execution of the first state update activity;

an act of sending a signal to the receive context, the signal indicating how the communication medium state is to be updated based on the results of attempting to update the application state and in accordance with the state coordination pattern; and an act of the receive context forwarding the signal for delivery to the communication medium.

13. The method as recited in claim 12, further comprising an act of detecting that the first state update activity successfully updated the application state from the content view.

14. The method as recited in claim 13, wherein the act of sending a signal to the receive context comprises an act of the first update state activity sending a signal to delete the message from the communication medium.

15. The method as recited in claim 12, further comprising:
an act of detecting that the first state update activity failed to successfully update the application state from the content view; and
an act of executing an alternate state update activity to attempt to update the application state from the content view in response to detecting the failure of the first state update activity to update the application state, the alternate state update activity included in the plurality of executable activities.

16. The method as recited in claim 15, further comprising an act of detecting that the alternate state update state activity successfully updated the application state; and
wherein the act of sending a signal to the receive context comprises an act of the alternate update state activity sending a signal to delete the message from the communication medium.

17. The method as recited in claim 15, further comprising an act of detecting that the alternate state update activity failed to successfully update the application state.

18. The method as recited in claim 17, wherein the act of sending a signal to the receive context comprises an act of sending a signal to unlock the message at the communication medium.

19. The method as recited in claim 12, wherein the act of receiving a content view of a message along with a communication proxy and forwarding the signal for delivery to the communication medium comprise an act of the application and the communication medium participating in a transaction that delivers the content view to the application and signals the communication medium to update communication state in accordance with the state coordination pattern.

20. The method as recited in claim 19, further comprising:
an act of the receive context participating in the transaction that delivers the content view to the application and signals the communication medium to update communication medium state;
an act of the transaction subsequently being rolled back; and an act of the application sending another signal to the receive context, possibly using a different transaction.

\* \* \* \* \*